Nov. 27, 1962
A. S. KROTZ
3,065,830
VEHICLE BRAKE DEVICE
Filed Dec. 9, 1959
2 Sheets-Sheet 1
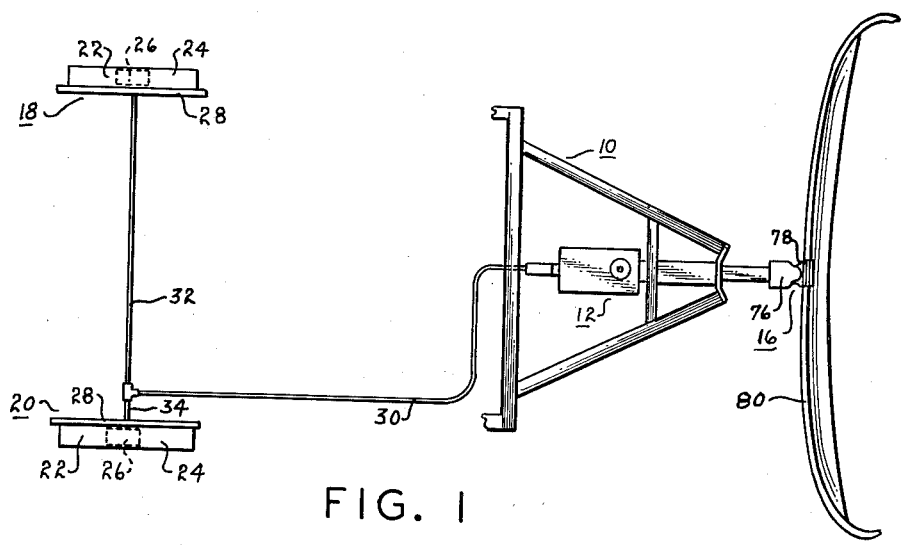
FIG. 1
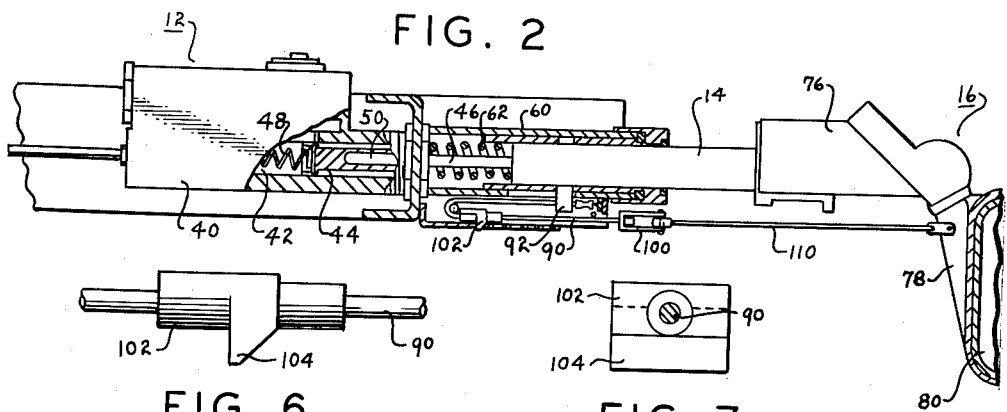
FIG. 2
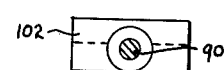
FIG. 6
FIG. 7
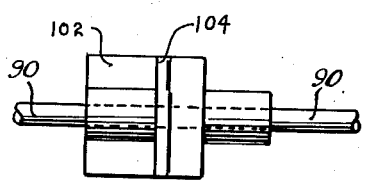
FIG. 8
*INVENTOR.*
ALVIN S. KROTZ
BY *M. A. Hobbs*
ATTORNEY Nov. 27, 1962 A. S. KROTZ 3,065,830
VEHICLE BRAKE DEVICE
Filed Dec. 9, 1959 2 Sheets-Sheet 2
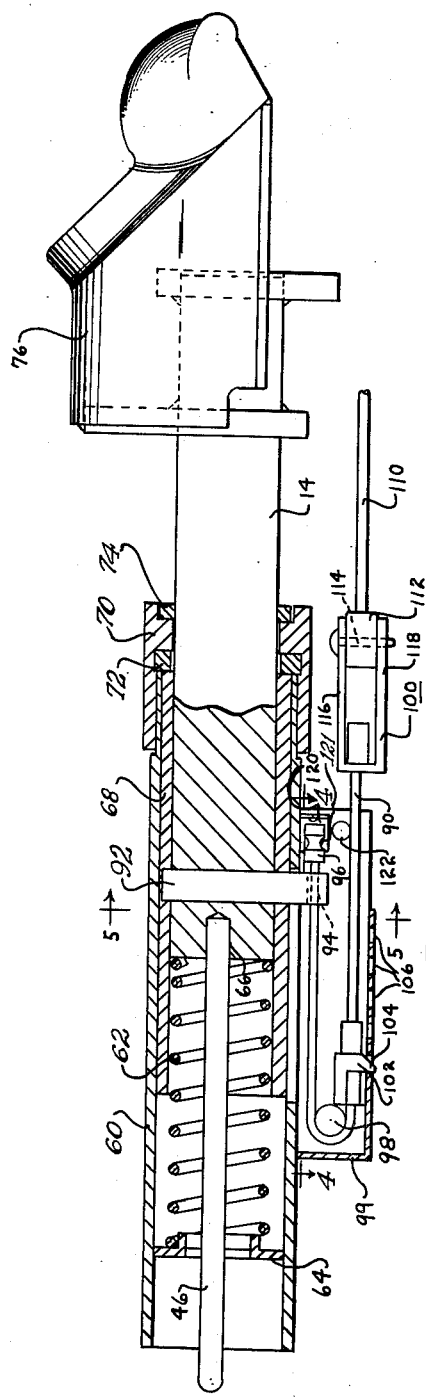
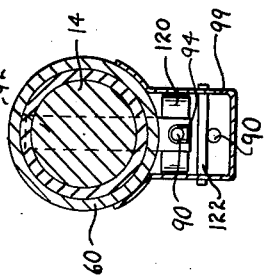
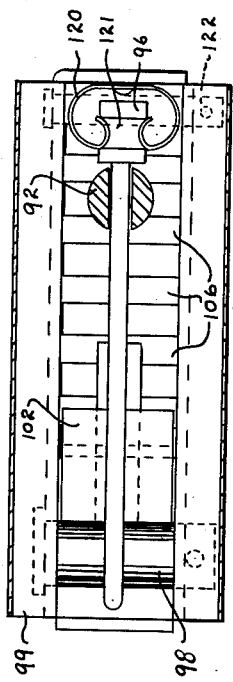
INVENTOR.
ALVIN S. KROTZ
BY M. A. Hobbs
ATTORNEY

United States Patent Office 3,065,830
Patented Nov. 27, 1962

3,065,830
VEHICLE BRAKE DEVICE
Alvin S. Krotz, Elkhart, Ind., assignor, by mesne assignments, to Dexter Axle Company, Inc., Elkhart, Ind., a corporation of Delaware
Filed Dec. 9, 1959, Ser. No. 858,533
3 Claims. (Cl. 188—112)

The present invention relates to a vehicle brake and more particularly to an emergency brake mechanism for trailers, mobile homes and the like.

One of the principal objects of the present invention is to provide a mechanism for automatically applying the brakes of a trailer, mobile home or the like in the event the vehicle becomes accidentally disconnected from a towing vehicle while the former is being towed.

Another object of the invention is to provide a mechanism which operates in conjunction with the conventional braking system of trailers and the like to automatically apply the brakes in the event the trailer breaks away from the towing vehicle, and which holds the brakes in a set position until they are intentionally released by a manual operation.

Still another object of the invention is to provide a brake mechanism which is constructed as an integral part of the conventional brake mechanism of a trailer and the like and which can be readily connected and disconnected from a towing vehicle.

A further object is to provide a mechanism of the aforesaid type which remains ready to apply the brakes of a trailer once it has been connected to the towing vehicle until it is intentionally disconnected from the latter vehicle and which does not interfere with the normal operation of the trailer brakes unless the trailer breaks away from the towing vehicle.

Another object of the invention is to provide an emergency braking mechanism for trailers and the like which is simple in construction and operation and which is connected to the towing vehicle with simple, easily attached removable fixtures.

Additional objects of the invention will become apparent from the following description and accompanying drawings, wherein:

FIGURE 1 is a fragmentary plan view of a trailer frame and brake system;

FIGURE 2 is a side elevational and partial cross sectional view of a combination trailer brake mechanism and tow bar, incorporating my emergency brake mechanism;

FIGURE 3 is an enlarged and partial cross sectional view of my emergency brake mechanism and tow bar, showing the two parts connected to the rear end of a towing vehicle;

FIGURE 4 is a horizontal cross sectional view of a portion of my emergency brake mechanism, taken on line 4—4 of FIGURE 3;

FIGURE 5 is a vertical cross sectional view of the tow bar and my emergency brake mechanism shown in the preceding figures, taken on line 5—5 of FIGURE 3;

FIGURE 6 is a side elevational view of a part of my emergency brake mechanism shown removed from the brake mechanism;

FIGURE 7 is an end elevational view of the part shown in FIGURE 6; and

FIGURE 8 is a bottom view of the part shown in FIGURES 6 and 7.

Referring more particularly to the drawings and to FIGURE 1 in particular, numeral 10 designates a portion of a trailer frame on which the present brake system is mounted, 12 being my brake actuating mechanism, 14 a tow bar for the trailer, 16 a hitch for connecting the tow bar to the towing vehicle and 18 and 20 wheel brake assemblies for the left and right wheels, each including brake shoes 22 and 24, hydraulic cylinder 26 and backing plate 28. The two brake assemblies 18 and 20 are connected with the actuating mechanism 12 by main hydraulic line 30 and branch lines 32 and 34, respectively. The particular type and construction of hydraulic wheel brake assemblies used on the towed vehicle are not important in the present invention. Those shown may be considered, for the purpose of the description, as conventional or standard assemblies available from a number of different manufacturers, and will not be described in detail herein. The present brake system and brake actuating mechanism may be used on trailers, mobile homes and other towed vehicles of various sizes, designs and constructions.

The present invention may be used in conjunction with most conventional hydraulic or mechanical brake actuating mechanisms. The actuating mechanism 12 shown is a surge type operated by tow bar 14 and consists of a housing 40 having a master cylinder 42 with a piston 44 therein which is adapted to be moved from the position shown by a push rod 46 to the left end of the cylinder, as viewed in FIGURE 2, and returned by spring 48 to its inoperative position shown in the drawings. The end of rod 46 shown in FIGURE 2 seats in a deep recess 50 in the center of piston 44 and the other end of the rod is operatively connected to tow bar 14, as will be more fully described hereinafter. While not important to the complete understanding of the present invention, the details concerning the construction and operation of the brake actuating mechanism contained in housing 40 are fully disclosed in copending application Serial No. 822,125 filed June 22, 1959.

The brake actuating mechanism is operated through rod 46 by the pressure exerted on tow bar 14 which is reciprocably mounted in a tubular housing 60 and urged to its extended position by a spring 62 disposed in housing 60 and reacting between the inner end of the tow bar and a ring 64 secured to the inner wall of the housing. Rod 46 is mounted in the tubular housing and passes through ring 64 and spring 62 and seats in a recess 66 in the end of bar 14. A sleeve 68 surrounds the end of bar 14 in the tubular housing and reciprocates in said housing with the bar. The left or inner end of housing 60 is rigidly secured to housing 40 of the brake actuating mechanism and the outer end is sealed by cap 70 threaded onto the end of housing 60 and sealed around bar 14 by a pair of gaskets 72 and 74. A hitch fixture 76 is rigidly secured to the free end of tow bar 14 and for the purpose of the present description may be considered conventional and of well known construction. Part 78 of the hitch is mounted on the rear bumper 80 or other part of a towing vehicle.

In addition to the conventional hitch mentioned above, the brake operating mechanism is connected to the bumper or other part of the towing vehicle by an emergency brake operating mechanism consisting of a flexible steel cable 90 attached at one end to the inner end of tow bar 14 by a pin 92 extending through the bar and having a slot or hole 94 through which the end of the cable is threaded and held by a lug 96 secured to the adjacent end of the cable. The cable is threaded around a pin or roller 98 supported in the side walls of body 99 and extends parallel with the tow bar to a fixture 100. Secured to the lower section of cable 90 is a latch 102 having a downwardly extending lug 104 for seating in one of a series of transverse slots 106 in the bottom of body 99, the latter being rigidly joined to the under side of housing 60 and forming a firm support for latch 102 when it is seated in one of slots 106. After the trailer is coupled to the towing vehicle, fixture 100 is connected to the towing vehicle by any suitable means such as the cable 110 which is connected at one end to hitch member 78 or some other rigid part of the towing vehicle and connected at the other end to fixture 100 by an eye 112 on the end of the cable and a shear pin 114 extending through holes in arms 116 and 118 in fixture 100 and through the hole in eye 112. Pin 114 is constructed of any suitable material, such as brass, which will shear under about 500 pounds pressure and release the trailer from the towing vehicle. Cable 90 is held in its retracted position, i.e. in its nonoperating position, by a spring clip 120 attached to the forward end of body 99 and snapping into an annular groove 121 in lug 96. A guide pin 122 is preferably placed over the lower section of cable near the forward end of body 99 to hold the cable close to the bottom of the body and thereby prevent latch 102 from becoming accidentally dislodged from a slot 106 after the emergency brake has been set.

In the operation of the present brake mechanism, with the trailer coupled to a towing vehicle by hitch 76 and with cable 90 of the emergency brake attached to the towing vehicle by cable 110, the surge brake shown operates in the normal manner applying and releasing the trailer brakes as pressure is applied on and released from tow bar 14, as fully described in the pending application previously mentioned herein. Cable 90 is held in its fully released position by spring clip 120 and pin 92 slides along the stationary cable as the tow bar reciprocates. In the event the conventional hitch, coupling the trailer to the towing vehicle, should become disconnected or broken so that the trailer breaks away from the towing vehicle, cable 110 immediately pulls cable 90 forward which in turn pulls tow bar 14 rearwardly and through rod 46 operates the brake actuating mechanism and applies the trailer brakes. As cable 90 is pulled forward latch 102 moves along the series of slots 106 and seats in the furthest one reached while the force is being applied to cable 90 by cable 110, thereby locking the trailer brakes. The setting of the trailer brakes in this manner applies additional force to the two cables 90 and 110, increasing the tension to the point sufficient to break shear pin 114 and release the trailer from the towing vehicle. The emergency brake mechanism retains the trailer brakes in their set braking position until lug 104 is removed from its slot 106 and the tow bar 14 returned to its extended position. Lug 104 can easily be removed from the slot with a screw driver or similar tool.

Although only one embodiment of the present brake mechanism has been described in detail herein, various changes and modifications may be made without departing from the scope of the invention. Further, the type of emergency brake mechanism may be used with other types of braking systems, both hydraulic and mechanical and with most types of towed vehicles.

I claim:

1. In combination with the brakes of a towed vehicle, an emergency brake operating mechanism, comprising a hydraulic cylinder, a piston in said cylinder, a bar for connecting the towed vehicle to a towing vehicle, a housing in which said bar reciprocates in response to pressure applied to said bar by the towing vehicle to move said piston and apply the towed vehicle brakes, a spring in said housing for urging said bar in the direction to release the brakes, a rod connecting said bar with the piston, a pin having a hole therein extending downwardly from said bar, a pin transversely arranged with respect to said bar and rigidly supported by said housing rearwardly of said first mentioned pin, a cable threaded through the hole in the first mentioned pin and extending around said second mentioned pin, lug means on the end of said cable for engaging said first mentioned pin, a means joined to the end of said cable opposite said lug for connecting said cable to the towing vehicle, a means connected to said cable having a shear pin adapted to break when a predetermined load is placed thereon between said cable and said last mentioned means, a member having a series of notches therein positioned parallel to said cable, a means rigidly attached to said cable and having a part for seating in one of said notches, and spring means for retaining said cable in the nonoperating position until it is pulled by the means connecting said cable to the towing vehicle.

2. In combination with the brakes of a towed vehicle, an emergency brake operating mechanism, comprising a hydraulic cylinder, a piston in said cylinder, a bar for connecting the towed vehicle to a towing vehicle, a housing in which said bar reciprocates in response to pressure applied to said bar by the towing vehicle to move said piston and apply the towed vehicle brakes, a spring in said housing for urging said bar in the direction to release the brakes, a rod connecting said bar with the piston, a pin having a hole therein extending outwardly from said bar, a pin transversely arranged with respect to said bar and rigidly supported by said housing rearwardly of said first mentioned pin, a flexible member threaded through the hole in the first mentioned pin and extending around said second mentioned pin, lug means on the end of said cable for engaging said first mentioned pin, a means joined to the end of said flexible member opposite said lug for connecting said flexible member to the towing vehicle, a means connected to said cable having a member adapted to break when a predetermined load is placed thereon between said cable and said last mentioned means, a member having a series of notches therein positioned parallel to said cable, a means rigidly attached to said flexible member and having a part for seating in one of said notches, and releasable means for retaining said cable in the nonoperating position until it is pulled by the means connecting said cable to the towing vehicle.

3. In combination with the brakes of a towed vehicle, an emergency brake operating mechanism, comprising a hydraulic cylinder, a piston in said cylinder, a bar for connecting the towed vehicle to a towing vehicle, a housing in which said bar reciprocates in response to pressure applied to said bar by the towing vehicle to move said piston and apply the towed vehicle brakes, a spring in said housing for urging said bar in the direction to release the brakes, a rod connecting said bar with the piston, a pin having a hole therein extending from said bar, a pin transversely arranged with respect to said bar and rigidly supported by said housing rearwardly of said first mentioned pin, a cable theaded through the hole in the first mentioned pin and extending around said second mentioned pin, lug means on the end of said cable for engaging said first mentioned pin, a means joined to the end of said cable opposite said lug for connecting said cable to the towing vehicle, a means connected to said cable having a member adapted to break when a predetermined load is placed thereon between said cable and said last mentioned means, a member having a series of notches therein positioned parallel to said cable, and a means rigidly attached to said cable and having a part for seating in one of said notches.

References Cited in the file of this patent

UNITED STATES PATENTS

| | | |
|---|---|---|
| 1,861,723 | Seeleke | June 7, 1932 |
| 1,879,981 | Hamilton | Sept. 27, 1932 |
| 1,922,719 | Townsend | Aug. 15, 1933 |
| 2,211,025 | Parkes | Aug. 13, 1940 |
| 2,834,437 | Davids | May 13, 1958 |
| 2,887,183 | Ross | May 19, 1959 |